US009449351B2

(12) United States Patent
Jewbali et al.

(10) Patent No.: US 9,449,351 B2
(45) Date of Patent: Sep. 20, 2016

(54) METHOD OF CHARACTERISING A RESOURCE

(75) Inventors: Arja Jogita Jewbali, Nollamara (AU); Arman Melkumyan, Lane Cove (AU); Fabio Ramos, Erskineville (AU)

(73) Assignees: Technological Resources Pty, Limited, Melbourne (AT); The University of Sydney, Sydney (AU)

(*) Notice: Subject to any disclaimer, the term of this patent is extended or adjusted under 35 U.S.C. 154(b) by 1159 days.

(21) Appl. No.: 13/378,964

(22) PCT Filed: Jun. 15, 2010

(86) PCT No.: PCT/AU2010/000738
§ 371 (c)(1),
(2), (4) Date: Apr. 10, 2012

(87) PCT Pub. No.: WO2010/144953
PCT Pub. Date: Dec. 23, 2010

(65) Prior Publication Data
US 2012/0205963 A1 Aug. 16, 2012

(30) Foreign Application Priority Data

Jun. 17, 2009 (AU) .............................. 2009902773

(51) Int. Cl.
*G06Q 50/02* (2012.01)
*G01V 1/30* (2006.01)
*G01V 11/00* (2006.01)

(52) U.S. Cl.
CPC .............. *G06Q 50/02* (2013.01); *G01V 1/30* (2013.01); *G01V 11/00* (2013.01); *G01V 2210/66* (2013.01)

(58) Field of Classification Search
CPC ...... G06K 9/62; G06Q 50/02; G06N 99/005; G05B 19/0405; G05B 13/00; G05B 13/024; E21B 44/00
USPC .............................................. 702/11; 703/10
See application file for complete search history.

(56) References Cited

U.S. PATENT DOCUMENTS

| | | | |
|---|---|---|---|
| 4,370,552 A * | 1/1983 | Li | 250/253 |
| 7,373,251 B2 | 5/2008 | Hamman et al. | |
| 7,961,955 B1 * | 6/2011 | Minter | 382/224 |
| 7,979,363 B1 * | 7/2011 | Minter | 706/12 |
| 7,983,490 B1 * | 7/2011 | Minter | 382/224 |
| 2005/0043894 A1 * | 2/2005 | Fernandez | 702/19 |
| 2006/0190219 A1 * | 8/2006 | Froyland et al. | 703/1 |
| 2006/0265342 A1 * | 11/2006 | Froyland et al. | 705/500 |
| 2007/0185750 A1 * | 8/2007 | Menabde | 705/7 |
| 2008/0046272 A1 * | 2/2008 | Menabde et al. | 705/1 |
| 2008/0162099 A1 * | 7/2008 | Vega Velasquez | 703/10 |
| 2009/0240481 A1 * | 9/2009 | Durrant-Whyte et al. | 703/7 |
| 2009/0256412 A1 | 10/2009 | Nieto et al. | |
| 2010/0032211 A1 * | 2/2010 | Gouws | 175/50 |

OTHER PUBLICATIONS

Benjamin J. Mason (Preparation of Soil Sampling Protocols: Sampling Techniques and Strategies, Jul. 1992).*
Matthias Seeger (Bayesian Gaussian Process Models: PAC-Bayesian Generalisation Error Bounds and Sparse Approximations, 2005).*
Diggle, Peter J; Ribeiro, Paulo J.; Bayesian Inference in Gaussian Model-based Geostatistics; 2002; Geographical & Environmental Modelling, vol. 6, No. 2; 129-146.*
International Search Report from the Australian Patent Office for International Application No. PCT/AU2010/000738, mailed Jul. 20, 2010.

* cited by examiner

*Primary Examiner* — Gregory J Toatley
*Assistant Examiner* — Terence Stifter, Jr.
(74) *Attorney, Agent, or Firm* — Banner and Witcoff (57) ABSTRACT

The present disclosure provides a method of characterizing a resource in a block located in an area. The method comprises the step of providing information concerning a property of the resource for a plurality of sample positions in, at or in the environment of the block. The information is obtained from analyzes of samples from the sample positions. The method further comprises modelling a change in the property along a distance at or within the block using the provided information. The method also comprises calculating parameters associated with the modelled change using Bayes' theorem and calculating a property characteristic of the resource for the block using the calculated parameters.

18 Claims, 5 Drawing Sheets

METHOD OF CHARACTERISING A RESOURCE

CROSS REFERENCE TO RELATED APPLICATIONS

This application is a national phase application based on international application number PCT/AU2010/000738, filed Jun. 15, 2010, and claims priority of Australian Patent Application No. 2009902773, filed Jun. 17, 2009, the content of both of which is incorporated herein by reference.

FIELD OF THE INVENTION

The present invention broadly relates to a method of characterising a resource.

BACKGROUND OF THE INVENTION

A mining plan usually is established prior to mining a resource, such as iron ore or any other ore. A number of samples may be taken from drill holes and a property of the samples, such as an iron grade, is analysed. Statistical methods are then used to predict the property at locations in the proximity of the drill holes.

Kriging is an established statistical method that is used for this purpose. However, kriging has significant disadvantages. For example, kriging systematically over- or under-estimates values ("conditional bias").

SUMMARY OF THE INVENTION

The present invention provides in a first aspect a method of characterising a resource in a block located in an area, the method comprising the steps of:
  providing information concerning a property of the resource for a plurality of sample positions in, at or in the environment of the block, the information being obtained from analyses of samples from the sample positions;
  modelling a change in the property along a distance at or within the block using the provided information;
  calculating parameters associated with the modelled change using Bayes' theorem; and
  calculating a property characteristic of the resource for the block using the calculated parameters.

Throughout this specification the term "block" is used for a volume or body of material that may comprise the resource and typically has a predetermined width, length and depth.

The block may be one of a plurality of blocks, such as adjacent blocks. For example, each block may be a block of a mining area or an area that is to be characterised, such as an area for which a mining plan is established.

In one specific embodiment the step of calculating parameters comprises use of a Gaussian or Gaussian-like probability distribution with Bayesian inference.

The resource may be an ore body, such as an iron ore or nickel ore body. Alternatively, the resource may comprise any other extractable substance.

The property may for example be an ore grade, such as an iron ore grade or nickel ore grade. Alternatively, the property may for example be a density, a rock type, a material type, an ore type, an ore grade or combinations thereof.

The method may comprise the additional step of providing an estimate of error of the parameter characteristic of the property for the block.

In one specific embodiment the step of providing information concerning a property of the resource for a plurality of sample positions comprises providing samples from drill holes at the sample positions, which may comprise providing samples from more than 2, more than 5, more than 10, more than 20 or even more than 50 sample positions. In this embodiment the block is one of a plurality of adjacent blocks and each block may be a block of an area. For example, drill holes may be placed at or near the boundary of adjacent blocks, such as at or near every second boundary.

Embodiments of the present invention have significant commercial advantages. For example, it is possible to calculate the property for a block typically with error estimates. Further, conditional bias associated with ordinary kriging may be reduced or even largely avoided.

In one specific example the step of modelling the change in the property comprises obtaining a mean of the property and a covariance function $c(x,x_{1-n})$ of the property ($x,x_{1-n}$: sample positions). The covariance function may be any suitable type of covariance function, but typically is a squared exponential covariance function. In this example the step of calculating the property for the block comprises calculating an average for the block using the mean and the covariance function.

The present invention provides in a second aspect a method of establishing a mining plan, the method comprising:
  calculating a property of a resource for a plurality of blocks using the method in accordance with the first aspect of the present invention;
  evaluating the property; and
  selecting blocks for mining the resource.

The present invention provides in a third aspect a method of guiding exploration of an area, the method comprising:
  calculating a property of a resource for a plurality of blocks using the method in accordance with the first aspect of the present invention;
  evaluating the property; and
  guiding the exploration of the area.

The method may also comprise the step of determining locations for sample positions at which samples are obtained from drill holes.

The present invention provides in a fourth aspect a method of mining in which resources are extracted in accordance with the method of the first, second or third aspect of the present invention.

The invention will be more fully understood from the following description of specific embodiments of the invention. The description is provided with reference to the accompanying drawings.

DETAILED DESCRIPTION OF SPECIFIC EMBODIMENTS

Specific embodiments of the present invention are initially described with reference to FIGS. 1 to 5.

Figure 1:
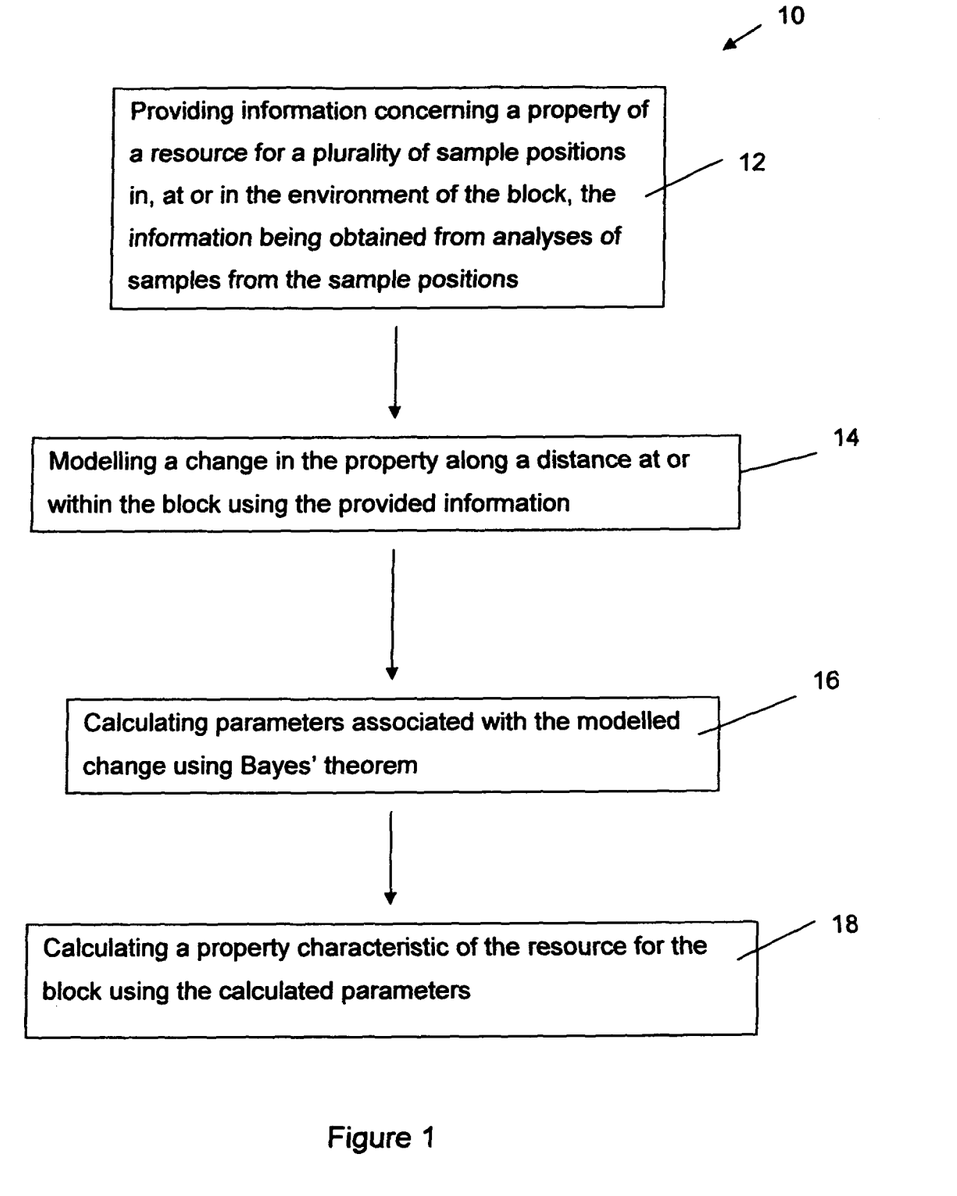
FIG. 1 is a flow diagram showing a method of characterising a resource in a block in accordance with an embodiment of the present invention.

A method 10 of characterising a resource in a block, as illustrated in FIG. 1, generally comprises an initial step 12 of providing information concerning a property of the resource for a plurality of sample positions in, at or in the environment of the block. The information is obtained from analyses of samples from the sample positions.

In one example, the resource is iron ore, and the property is iron ore grade. It will be appreciated that the resource may be any ore body, such as a nickel ore body, or the resource may comprise any other extractable substance.

Figure 2:
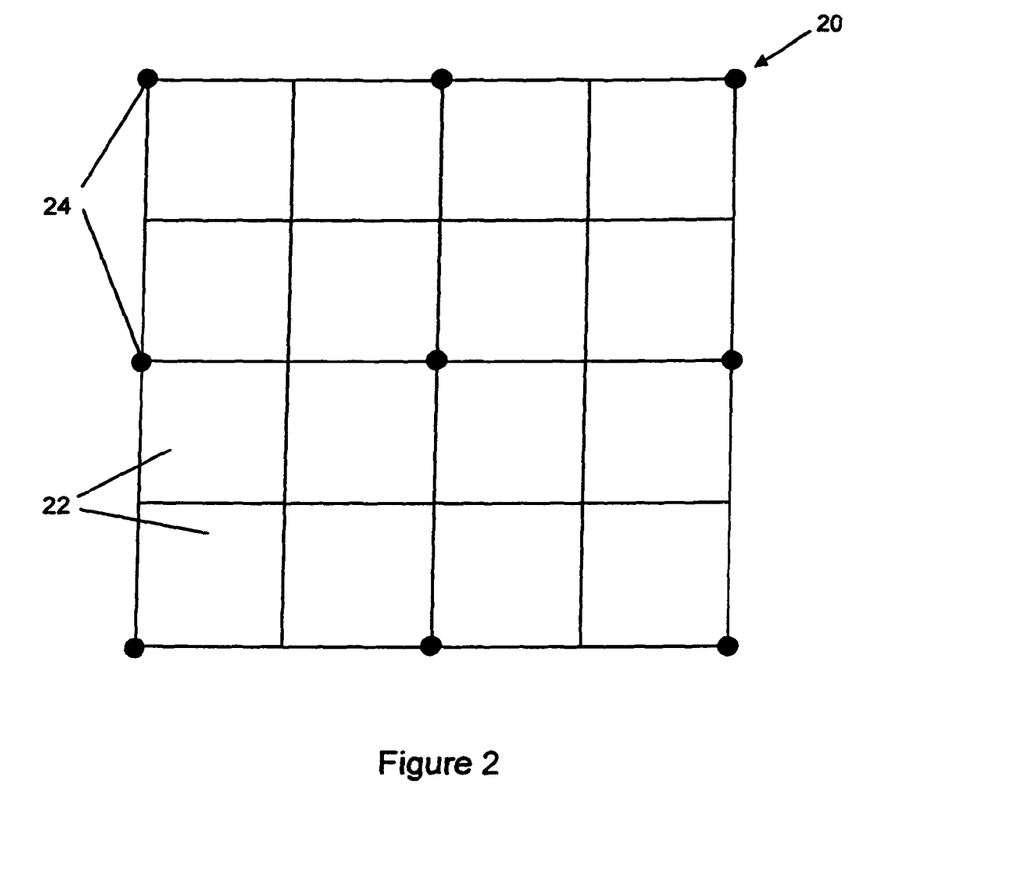
FIG. 2 is a top view of an area of land divided into blocks and showing drill holes corresponding to sample positions.

For the example, where the resource is iron ore, providing the information may comprise dividing an area of land 20 into blocks 22, and taking core samples from drill holes 24 at selected sample positions as shown in FIG. 2. Each core sample is assayed to provide information regarding the iron ore grade at the sample positions corresponding to the drill holes 24.

Each block 22 in this example measures 50 meters by 50 meters, and may further be given a depth so as to define a volume. It will be appreciated however that the size of each block 22 may be any size or shape, and the dimensions of each block 22 do not need to be uniform. The drill holes 24 are shown to be taken at positions corresponding to corners of the blocks 22, and are drilled in this example at 100 meter intervals. It will be appreciated, however, that the drill holes 24 may be taken at any other positions, including inside the blocks 22.

The method comprises a second step 14 of modelling a change in the property along a distance at or within the block using the provided information. The method further comprises a third step 16 of calculating parameters associated with the modelled change using Bayes' theorem and a fourth step 18 of calculating a property for the block using the calculated parameters.

In one embodiment, the step of calculating parameters comprises use of a Gaussian or Gaussian-like probability distribution with the Bayes' theorem. The Gaussian distribution can assist in making some of the calculations more convenient, however it will be appreciated that other distributions may be used. When the Gaussian distribution is used, it is assumed that a joint distribution of the iron ore grade as measured at each drill hole 24 is multivariate Gaussian.

In the present embodiment, the change in the property (i.e.: iron ore grade) can be modelled as a Gaussian process f(x) where x is representative of the sample position. The iron ore grades as measured at each drill hole 24 may also be obtained by calculating the Gaussian process f(x) for each value of x corresponding to respective drill holes 24.

The Gaussian process f(x) may be defined by a corresponding mean function and a covariance function. For the Gaussian process f(x) it may be assumed that the mean function is $h(x)^T B$ and the covariance function is $c(x,x')$, where $h(x)$ are a set of known functions and B are coefficients that may be determined from, for example, the core samples taken from corresponding drill holes 24, and where x and x' are values representative of sample locations of corresponding drill holes 24.

In general, the covariance function will comprise additional parameters. These additional parameters are also referred to as hyper-parameters. The hyper-parameters may control various aspects of the Gaussian process f(x). In one example, the covariance function in the Gaussian process f(x) is a squared exponential function. It will be appreciated, however, that the covariance function may alternatively be implemented as a neural network or as a Matern model. In the case where the covariance function is a squared exponential function, it will have the general form:

$$K(x_1, x_2) = \sigma_f^2 \exp\left(-\frac{1}{2l^2}(x_1 - x_2)^2\right) \quad \text{Eqn. 1}$$

Where:
- K is a covariance function of $x_1$ and $x_2$;
- $x_1$ and $x_2$ are variables that may, for example, be representative of sample positions corresponding to drill holes 24;
- $\sigma_f^2$ is a smoothness parameter where, in general, σ denotes variance and the subscript f denotes that the variance relates to a signal f; and
- l is a length scale.

This function has two hyper parameters: $\sigma_f^2$, which is a smoothness parameter, and l, which is a length scale. The (hyper) parameters are determined from the samples by optimising an objective function known as the marginal likelihood. This function arrives in Bayesian statistics as a result of convolving the likelihood function with probability distributions over its parameters. The determination of the parameters as an optimisation procedure on the marginal likelihood is also referred to in the Gaussian process as learning the parameters. By optimising the (log) marginal likelihood, a trade-off between data fit and complexity is achieved resulting in parameters that generalise well to unobserved data. This, in turn, provides accurate covariance functions that aptly model property changes in each direction.

After an appropriate covariance function and parameters have been provided, the property for the block is calculated. In this embodiment, an estimate of an average value of the iron ore grade over a volume V, for example the volume of a block 22, is calculated by determining the average of Gaussian process f(x) over volume V.

The above may be written as an integral k:

$$k = \int f(x)p(x)dx \quad \text{Eqn. 2}$$

Where:
- k is an integral for determining the average of Gaussian process f(x) over volume V
- p(x) is a probability density function (i.e.: ∫(x)=1); and
- f(x) is a Gaussian process.

By assuming that f(x) is a Gaussian process with a mean $h(x)^T B$ and covariance function $c(x,x')$, it is possible to derive a distribution for integral k. This can be done by first sampling the fitted Gaussian process at locations $x_1, x_2 \ldots x_n$ to find $f = f(x_1), f(x_2) \ldots f(x_n)$.

The distribution of the integral k depends on the following three assumptions:

Assumption 1:

If it is assumed that B (the coefficients for h(x)) and $\sigma_f^2$ (the smoothness parameter for the covariance function) are known, then the integral k is normal distributed with a mean and a variance given by Equations 3 and 4 (below):

$$\text{mean} = RB + TA^{-1}(f - HB) \qquad \text{Eqn. 3}$$

$$\text{var} = \sigma_f^2 (U - TA^{-1}T^T) \qquad \text{Eqn. 4}$$

Where: $H = \begin{bmatrix} h(x_1)^T \\ \dots \\ h(x_n)^T \end{bmatrix}$ contains the values of the known functions h(x) at the sampled locations $x_1, x_2 \dots x_n$;
B is a matrix that contains the coefficients for h(x), in this case known;
A is a matrix containing the covariances between the data locations $x_1, x_2 \dots x_n$;

$$R = \int h(x)^T p(x) dx; \qquad \text{Eqn. 5}$$

$$T = \int t(x)^T p(x) dx \qquad \text{Eqn. 6}$$

With t(x) representing a covariance matrix given by:

$$\begin{bmatrix} \text{cov}(x, x_1) \\ \dots \\ \text{cov}(x, x_n) \end{bmatrix}; \text{ and } U = \int c(x, x') p(x) p(x') dx dx' \qquad \text{Eqn. 7}$$

Regarding Equations 5, 6 and 7: R is the average of the mean function over volume V; T is the average covariance between all the points in volume V and all the data locations; and U corresponds to the variance of the volume V.

Assumption 2:
If it is assumed that B (the coefficients for h(x)) is unknown and $\sigma_f^2$ (the smoothness parameter for the covariance function) is known, then the integral k is normal distributed with mean and variance given by Equations 8 and 9 (below). Within the Gaussian process framework information available beforehand (before the analysis is carried out) about unknown parameters is determined through a prior distribution. In this case for B, a non informative prior is used as a starting point to derive the equations below. A non-informative prior distributions makes inferences that are not greatly affected by external information or when external information is not available.

$$\text{mean} = R\hat{B} + TA^{-1}(f - H\hat{B}) \qquad \text{Eqn. 8}$$

$$\text{var} = \sigma_f^2 (U - TA^{-1}T^T + (R - TA^{-1}H)(H^T A^{-1} H)^{-1}(R - TA^{-1}H)^T) \qquad \text{Eqn. 9}$$

Where $\hat{B}$ is a matrix that contains the estimated values for the coefficients B from the samples having the form:

$$\hat{B} = (H^T A^{-1} H)^{-1} H^T A^{-1} f \qquad \text{Eqn. 10}$$

The values for R, T and U are as per equations 5, 6 and 7 as used in the case for Assumption 1. In Assumption 2, variance is larger due to not knowing the B coefficients.

Assumption 3:
If it is assumed that both B (the coefficients for h(x)) and $\sigma_f^2$ (the smoothness parameter for the covariance function) are unknown then the distribution of integral k is a t-distribution with (n-q) degrees of freedom where n is the number of data locations $x_1, x_2 \dots x_n$ and q is the number of functions in h(x). The mean and variance of k are given in Equations 11 and 12 (below). In this case, prior information about the behaviour of B and $\sigma_f^2$ is obtained by assuming a non informative prior as a starting point to derive the equations below:

$$\text{mean} = R\hat{B} + TA^{-1}(f - H\hat{B}); \qquad \text{Eqn. 11}$$

$$\text{var} = d(U - TA^{-1}T^T + (R - TA^{-1}H)(H^T A^{-1} H)^{-1}(R - TA^{-1}H)^T); \qquad \text{Eqn. 12}$$

and $$d = f^T \{A^{-1} - A^{-1} H (H^T A^{-1} H)^{-1} H^T A^{-1}\} f; \qquad \text{Eqn. 13}$$

Figure 3:
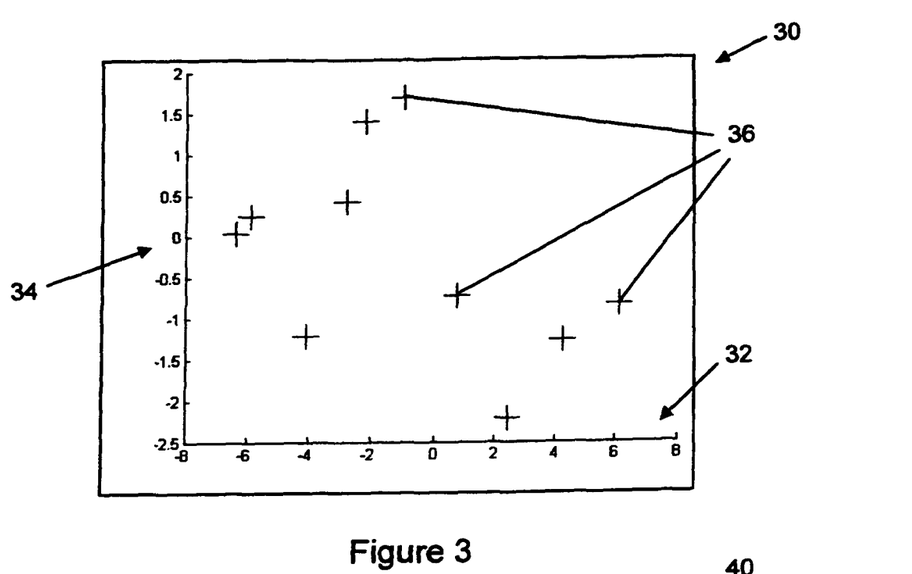
FIG. 3 is a graph of data points showing the position of each sample against a measured property of each sample for a 1-dimensional example.
Figure 4:
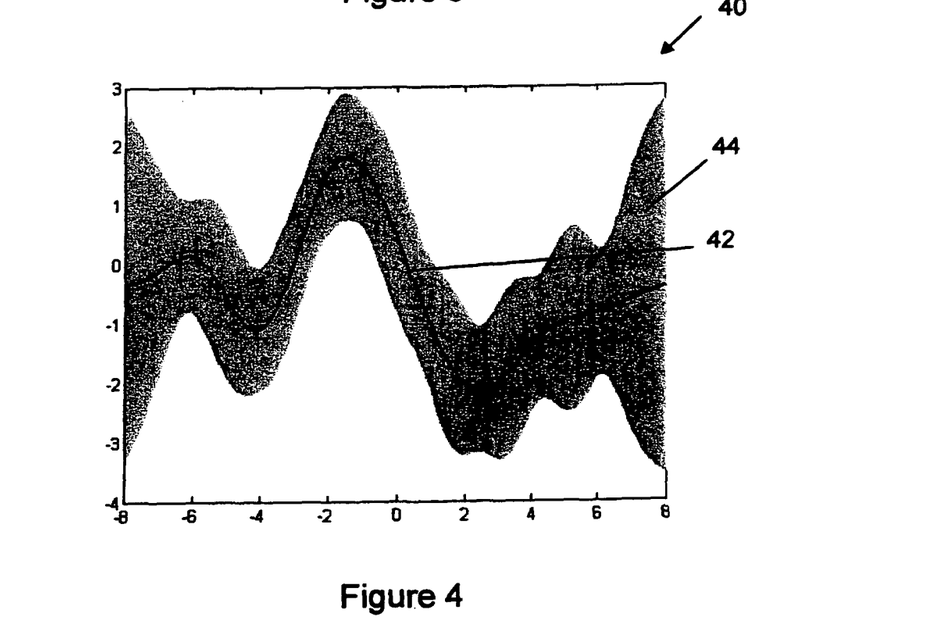
FIG. 4 shows the graph of FIG. 3 having a Gaussian process fitted to the data points to form a curve, and showing an estimated error for the curve.
Figure 5:
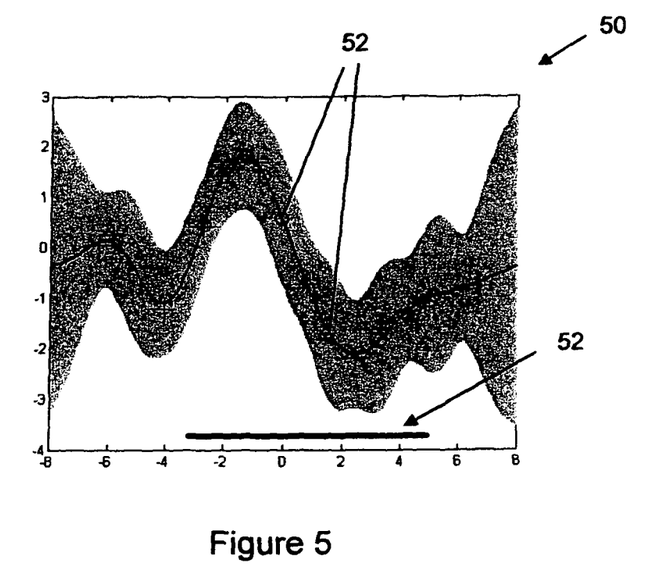
FIG. 5 shows the graph of FIG. 4 having sampled the curve at locations marked by circles.

In an example shown in FIGS. 3 to 5, Assumption 2 is used as it is assumed that the Gaussian process has been fitted to the data and that $\sigma_f^2$ is thus known. It will be appreciated that this is just one example, and has been used for ease of calculation. With the different assumptions, the method can thus account for uncertainty in the parameters B and $\sigma_f^2$.

In this case, the integrals R, T and U are as per Equations 5, 6, and 7 and have closed form solutions when p(x) is Gaussian or a finite mixture of Gaussian distributions and when the covariance function is the squared exponential function. When p(x) is a finite mixture of Gaussian distributions i.e.

$$p(x) = \sum_{i=1}^{I} \lambda_i p_i(x) \text{ with } p_i(x) \sim N(m_i, v_i), \sum_{i=1}^{I} \lambda_i = 1,$$

and we assume h(x)=1 for simplicity, then Equations 5, 6 and 7 for R, T and U become:

$$R = \int p(x) dx = 1 \qquad \text{Eqn. 14}$$

$$T = \sum_{i=1}^{I} \lambda_i \left(1 + \frac{v_i}{l^2}\right)^{-0.5} \exp\left\{-\frac{1}{2} \frac{(x_m - m_i)^2}{(l^2 + v_i)}\right\} \qquad \text{Eqn. 15}$$

$$U = \sum_{i=1}^{I} \sum_{j=1}^{I} \lambda_i \lambda_j (v_i v_j |V_{ij}|)^{-0.5} \exp\left\{-\frac{1}{2}\left\{u_{ij}^T V_{ij} u_{ij} - \left(\frac{m_i^2}{v_i} + \frac{m_j^2}{v_j}\right)\right\}\right\} \qquad \text{Eqn. 16}$$

Where:

$$V_{ij} = \begin{bmatrix} \frac{1}{l^2} + v_i^{-1} & -\frac{1}{l^2} \\ -\frac{1}{l^2} & \frac{1}{l^2} + v_j^{-1} \end{bmatrix} \qquad \text{Eqn. 17}$$

$$u_{ij} = V_{ij}^{-1} \begin{bmatrix} \frac{m_i}{v_i} \\ \frac{m_j}{v_j} \end{bmatrix} \qquad \text{Eqn. 18}$$

Regarding the above equations:

$$p(x) = \sum_{i=1}^{I} \lambda_i p_i(x)$$

indicates that p(x) is drawn from a mixture of Gaussian distributions wherein $\lambda_i$ are weights that are given to each Gaussian distribution;

$p_i(x) \sim N(m_i, v_i)$ indicates that $p_i(x)$ is drawn from a Gaussian distribution with mean $m_i$ and variance $v_i$;

l represents the number of Gaussian distributions that make up the mixture;

i,j in Equation 15 and 16 are counters that loop over the number of Gaussian distributions that make up the mixture and wherein the maximum value i and j may both have is l; and $x_m$ are the locations where the Gaussian process f(x) is sampled, for example at sample points 52 as shown and described later with reference to FIG. 5.

Other closed form solutions for Integrals R, T and U have also been derived for the "Matern" covariance function (eq.3) and a uniform p(x). In general a uniform p(x) is easiest to use since it gives any point inside the block equal weight. If no closed form solution for Integrals R, T and U is available they can be derived using numerical methods.

With these closed form solutions we can then calculate the parameters of the distribution for integral k.

This process is illustrated in FIGS. 3 to 5. This example is described in one-dimension, again for ease of calculation, however it will be appreciated that the method may be extended to two and three dimensions.

FIG. 3 shows a graph 30 comprising an x-axis 32 measuring the sample position of a sample, for example the position a core sample taken from drill holes 24 along a line passing through a block 22. The y-axis 34 corresponds to a parameter that has been measured, for example an assayed ore grade, from the core samples of each drill hole 24. Although the scales are arbitrary in this example, it will be appreciated that the scales may correspond to real measurements. The graph comprises a plurality of data points 36 corresponding to information derived from a plurality of drill holes 24.

FIG. 4 shows the curve 42 corresponding to a fitted Gaussian process f(x) having been fitted in accordance with the above. Since the curve 42 has been fitted by a statistical process, it is also possible to show an error 44 associated with the fitting of the curve to the data points 36. In this example, the error 44 is shown as a shaded area in FIG. 4 and corresponds to twice the standard deviation of the Gaussian process f(x).

Finally, as shown in FIG. 5, the fitted Gaussian process f(x) may be sampled at sample points 52 so as to calculate an average value of the parameter (i.e.: the iron ore grade) over a particular length interval, in this case between −3 and 5 of the x-axis 32 as shown by a black bar 54. In this example, and using Equations 8 and 9 as described above, the mean and variance of the distribution of integral k is calculated over the interval −3 to 5. In this example, the mean is calculated as −0.3189 and the variance of the distribution of the integral k is calculated as 0.0206. For example, in the case where the iron ore grade is being measured, the mean would be the average iron ore grade over the interval −3 and 5, and the variance would be related to an error parameter that provides an indication of the accuracy of the calculated mean. Since the distribution for integral k is Gaussian, it is completely defined by the calculated mean and variance.

By the above method, it is therefore possible to calculate the mean of the iron ore grade for a given volume (for example if the above is extended to three-dimensions) and the variance of the iron ore grade so as to provide an error parameter to indicate how accurate the estimation is.

Figure 6:
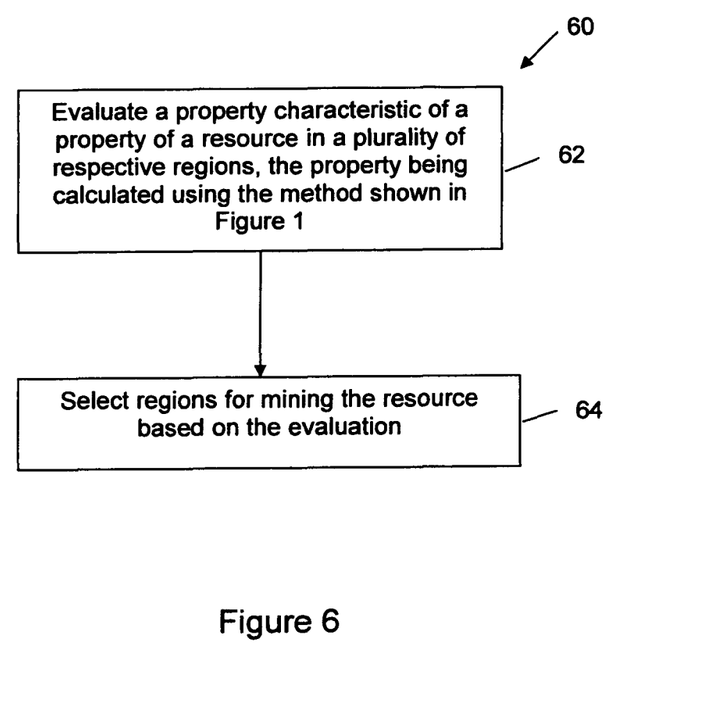
FIG. 6 is a flow diagram showing a method of establishing a mining plan in accordance with a further embodiment of the present invention.

This allows a method 60 to be used for establishing a mining plan as shown in FIG. 6. The method 60 comprises the first step 62 of evaluating a parameter characteristic of a property of a resource in a plurality of respective blocks, the parameter being calculated using method 10; and a second step 64 of selecting blocks for mining the resource based on the evaluation of the first step 62.

For example, it may be determined that the mean of the iron ore grade is sufficient for mining a block to be economically viable. Alternatively, if the error parameter associated with the mean of the iron ore grade in a first block is beyond a threshold of risk, then it may be decided that the first block be mined along with a second block having a substantially smaller error parameter so as to minimise the risk associated with mining the first block.

In a further alternative, it may be determined that the error parameter is too high for a decision to be made with sufficient certainty. In such a situation, it may be decided that mining a certain block is delayed until a time at which more data is available, for example by providing more information in accordance with the first step 12 of method 10. After more information is available, the third and fourth steps 16, 18 may be conducted again so as to assist in the method 60 of selecting the block for possible mining.

It will be appreciated that a variation of the method 60 may also be used for guiding exploration, such as for guiding the selection of locations for drill holes.

Although the invention has been described with reference to particular examples, it will be appreciated by those skilled in the art that the invention may be embodied in many other forms. For example, the method may be applied to other ore bodies, for example nickel ore bodies, or to other extractable resources. Other appropriate statistical distributions may be used, and the methods for evaluating integrals for such distributions need not be restricted to those described in the foregoing description. Further, the samples need not be taken from drill holes, and may be extracted in other fashions. Information relating to the parameter, for example iron ore grade, may be obtained in ways other than analysing samples that have been extracted.

The blocks may be of any shape and size. Further, a block may be any combination of blocks, or alternatively may be a subdivision of a block. The samples may be taken from any number of positions and be taken from any distribution of positions.

The invention claimed is:

1. A method of evaluating a property of a resource in a block located in an area of land, the method comprising the steps of:
    a) dividing the area of land into a plurality of blocks;
    b) obtaining samples from a plurality of sample positions within at least one block of the plurality of blocks;
    c) providing information concerning the property of the resource for the plurality of sample positions, the information being obtained from analyses of the samples from the sample positions;
    d) generating a model for a change in the property of the resource along a distance at or within the one block using the provided information;
    e) calculating parameters associated with the modelled change using Bayes' theorem;
    f) calculating for the block a property characteristic of the modelled change in the property of the resource using the calculated parameters, the property characteristic being a value based on at least two sample positions within the one block; and
    outputting the value in order to assist in making a decision related to mining of the resource in the area of land.

2. The method of claim 1 wherein the step of calculating parameters comprises use of a Gaussian or Gaussian-like probability distribution with Bayesian inference.

3. The method of claim 1 wherein the property is an iron ore grade.

4. The method of claim 1 further comprising obtaining samples from a plurality of sample positions within another one of the plurality of blocks and repeating steps c)-g).

5. The method of claim 1, wherein the step of providing information concerning a property of the resource for a plurality of sample positions comprises providing samples from drill holes at the sample positions.

6. The method of claim 5, wherein the at least one block is at least one of a plurality of adjacent blocks of the area.

7. The method of claim 6, wherein the drill holes are placed at or near the boundary of adjacent blocks.

8. The method of claim 1 wherein the step of modelling the change in the property comprises obtaining a mean function of the property and a covariance function $c(x, x_{1-n})$ of the property ($x, x_{1-n}$: sample positions).

9. The method of claim 8, wherein the covariance function is a squared exponential covariance function.

10. The method of claim 8, wherein the step of calculating the property characteristic comprises calculating an average for the block using the mean of function and the covariance function.

11. A method of establishing a mining plan, the method comprising:
   evaluating a property of a resource for a plurality of blocks using the method as claimed in claim 1; and
   selecting blocks for mining the resource.

12. A method of guiding exploration of an area, the method comprising:
   evaluating a property of a resource for a plurality of blocks using the method in accordance with claim 1; and
   guiding the exploration of the area.

13. The method of claim 12 comprising the step of determining locations for sample positions at which samples are obtained from drill holes.

14. A method of mining in which resources are extracted in accordance with the method of claim 1.

15. The method of claim 1, wherein calculating the property characteristic of the modelled change comprises interpolating the modelled change, the interpolation being a spatial interpolation over at least two sample positions.

16. The method of claim 15, comprising interpolating the modelled change in order to calculate an average of the modelled change in the property of the resource, the calculated average being a spatial average over at least two sample positions within the block.

17. The method of claim 1 wherein the resource is an ore body.

18. The method of claim 17 wherein the ore body is an iron ore body.

* * * * *